April 1, 1958     C. S. HAZARD     2,828,648
REVERSIBLE VARIABLE RATIO DRIVE MECHANISM
Filed Oct. 26, 1956     3 Sheets-Sheet 1

INVENTOR
CHARLES S. HAZARD

BY George H. Corey

ATTORNEY

April 1, 1958 C. S. HAZARD 2,828,648
REVERSIBLE VARIABLE RATIO DRIVE MECHANISM
Filed Oct. 26, 1956 3 Sheets-Sheet 2

INVENTOR
CHARLES S. HAZARD
BY George H. Corey
ATTORNEY

April 1, 1958     C. S. HAZARD     2,828,648
REVERSIBLE VARIABLE RATIO DRIVE MECHANISM
Filed Oct. 26, 1956     3 Sheets-Sheet 3
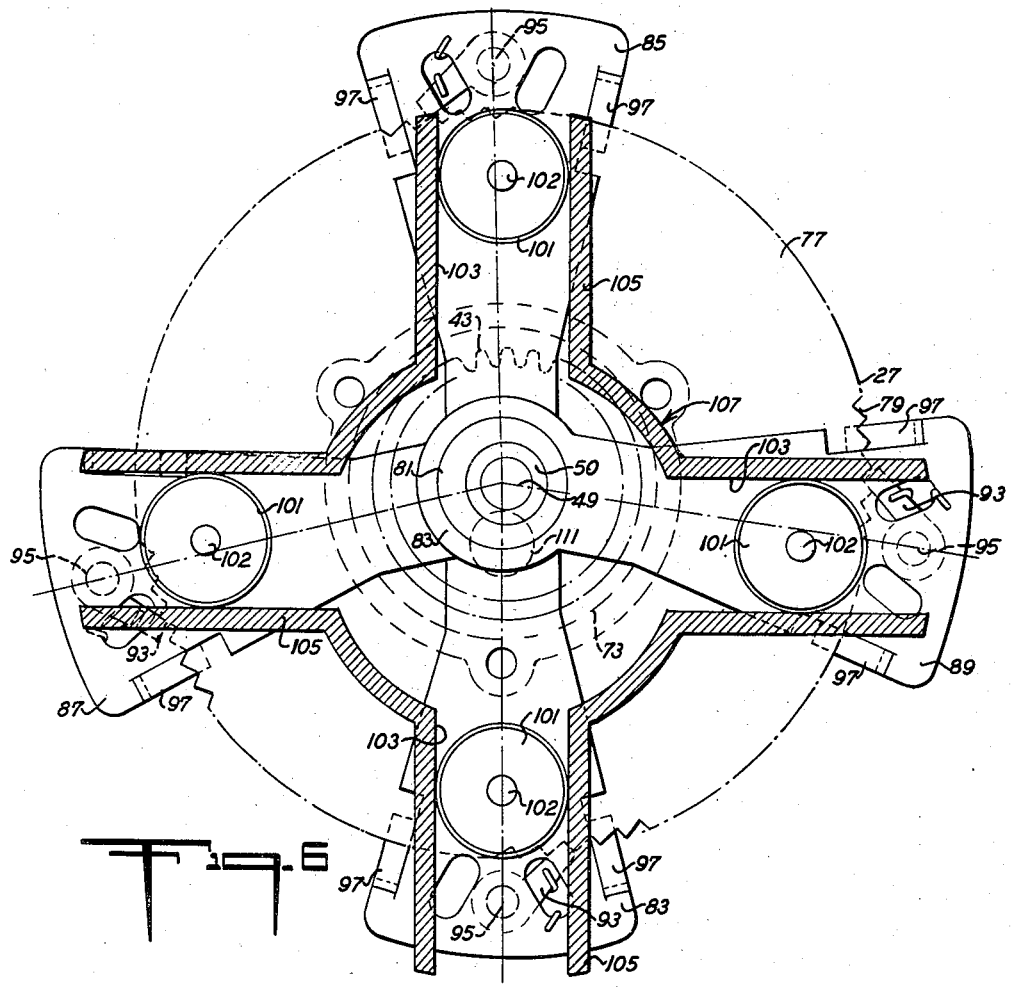
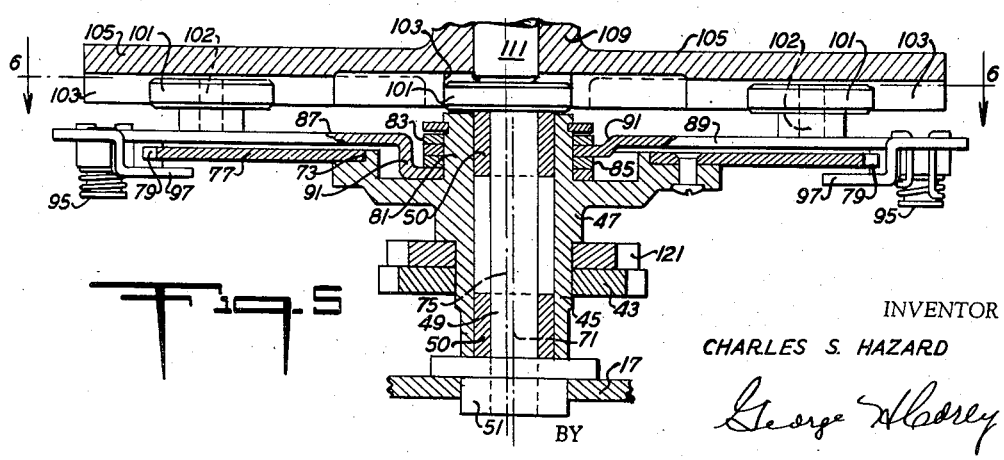
INVENTOR
CHARLES S. HAZARD
ATTORNEY United States Patent Office 2,828,648
Patented Apr. 1, 1958

2,828,648
REVERSIBLE VARIABLE RATIO DRIVE MECHANISM

Charles S. Hazard, New York, N. Y., assignor to Neptune Meter Company, a corporation of New Jersey Application October 26, 1956, Serial No. 618,463

6 Claims. (Cl. 74—640)

This invention relates to a variable ratio mechanism and more especially to a mechanism for changing the ratio of rotation of a driven shaft to the rotations of a driving shaft in small increments. The invention particularly relates to such a variable ratio mechanism to be operatively connected to a register and driven by a positive displacement fluid meter to vary the ratio of drive of the register with respect to the meter.

It has been proposed heretofore to construct a variable ratio mechanism for varying the ratio of a register driven by a positive displacement meter and utilizing a unidirectional rotatable member. In such prior art mechanisms upon reversal of the rotation of the driving or input shaft driven by the meter reverse rotation of the output shaft driving the register has not been produced because of the inherent incapability of the unidirectional device to operate in the reverse direction. Moreover, in many of these variable ratio mechanisms unidirectional devices of the roller clutch type have been used with a view to securing a smooth curve of change of the ratio. Such roller clutch devices, however, are disadvantageous because of the inherent wear and inaccuracies in the action thereof which develop from the operation of the clutches due to their characteristic of utilizing the frictional and jamming action of the roller or equivalent element.

Variable ratio mechanisms of the type to which the invention relates have been utilized for the purpose of compensating for minor manufacturing variations in the meter resulting in variations in the displacement effected by the measuring unit thereof. They also have been used to compensate for variations in the volume of a liquid due to variations in temperature as well as in the viscosity of the liquid; also to compensate for variations in the density of the liquid so as to secure readings in units of weight instead of in units of volume. This last type of compensation requires a much greater range of ratios than the first three referred to and such greater range should be secured with as smooth a curve of change of ratio as possible.

It is an object of the invention, therefore, to provide in a variable ratio mechanism an increased range of ratios with increments of change of such small amount as to approximate for practical purposes a smooth curve.

It is another object of the invention to provide a variable ratio mechanism having such an increased range of ratios without introducing undesirable cyclic variations in the movement of the output element or the angular velocity of an output shaft relative to the movement of the input element or the angular velocity of an input shaft.

It is a further object of the invention to provide for reversal of the output shaft and of the register connected thereto upon reversal of the meter and of the input shaft of the mechanism connected thereto so that the register will record subtractively when reverse flow of the fluid through the meter occurs.

It is an additional object of the invention to provide a variable ratio mechanism in which the increments of change are positively determined and maintained in accordance with any selected setting of the variable ratio mechanism.

In order to secure the positive action just referred to the invention differs from many of the prior art devices in utilizing a unidirectional device in which positive step by step rotation is secured. Such a device preferably is provided by a ratchet rotatable on an axis and actuating or actuated by an arm and pawl device with the pawl engaging the ratchet teeth. Definite increments of rotation thereby may be secured corresponding to the number of teeth which a given pawl passes over in movement thereof relative to the perimeter of the ratchet on which the teeth are disposed.

Means is provided which is settable to different positions corresponding to different desired ratios of rotation of a rotatable output member of the variable ratio mechanism with respect to a rotatable input member, this settable means being operatively connected to these rotatable output and input members to effect rotation of one with respect to the other in a selected ratio at a selected setting of the settable means. Means are also provided for changing in stepped increments the rotation of the output member in relation to the rotation of the input member, these increments being varied in accordance with the different settings of the settable means.

By utilizing means such as the ratchet and pawl the definite increments of rotation are secured concomitantly with the unidirectional rotation of the members of the variable ratio mechanism referred to. The steps of increment, however, may be larger than desired except by using a very large number of teeth on the ratchet. Several means are provided, therefore, in accordance with the invention for modifying the increments of rotation to secure increments of such reduced size as to afford an overall relation of rotation of the output member with respect to the rotation of the input member variable to give substantially the effect of a smooth curve for the different settings of the settable means. These means include the support of different rotatable elements of the device in slightly eccentric relation to each other.

It is an important feature of the invention that, in a variable ratio mechanism utilizing such a unidirectional rotatable member to secure the positive action referred to but which can not effect reversal of an output rotatable member upon reversal of an input rotatable member, means are provided for securing reversal of this output member concomitantly with reversal of the input member. In order to provide such means the invention utilizes two trains of gears in which idler gears are supported for movement relative to input and output gears of the trains. One of these trains is associated with the input rotatable member of the variable ratio mechanism and the other train is associated with the output rotatable member. Supporting means are utilized for the sets of idler gears which provide for engaging a given idler gear of the input gear train concomitantly with engagement of a given idler gear of the output gear train. Similarly, the given idler gears of the two trains are concomitantly disengaged. Such movements of these idler gears are effected by means of a support or frame which is movable relative to the input and output rotatable members.

As will be understood more clearly from the description to follow in connection with the drawings these two gear trains are of such number of gears and so disposed with respect to the input and output rotatable members of the variable ratio mechanisms that, upon engagement of the given idler gears with respective predetermined gears of their respective trains, the output rotatable member is rotated in a forward direction upon forward rotation of the input member. Similarly, although the unidirectional members of the variable ratio mechanism are interposed therebetween and maintain their direction of rotation, upon reverse rotation of the input member reverse rotation of the output member is produced.

It is a further feature of the invention that for either direction of rotation of the input member the idler gears of both trains are forced into meshing relation with the respective predetermined gears of the train by virtue of the forces developed by the rotation of the input gear of the input train and of the output gear of the output train, so that by the rotating and driving action of the trains and of the meshing gears the gears of these trains are biased into mesh rather than out of mesh.

Means also are provided in connection with this invention to insure that the gears of the input train shall reach meshing engagement prior to the gears of the output train and that gears of this input train shall pass out of meshing engagement after the gears of the output train have passed out of engagement in the movements of the idler gears above mentioned which are secured by movement of the support or frame. This insures that the gears of the output gear train will not hold the gears of the input train out of mesh. Moreover, resilient means are provided in connection with each of the gear trains so that, in the event that a tooth of one gear of a train comes into abutment with the top of a tooth of another gear of a train during the meshing and demeshing movements, breakage is avoided and the gears will be rotated to positions where they may move into mesh with each other. The gear trains and the variable ratio mechanism thus always will be driven upon rotation of an input element or the input gear of the input train which may be driven as by a meter.

Other objects and features of the invention will be understood from the description of the drawings now to follow in which:

Fig. 5 is a vertical section taken on line 5—5 viewed from the right in Fig. 1 and showing the construction of the rotatable input member and ratchet of the variable ratio mechanism driving the settable means;

Fig. 6 is a horizontal section taken on line 6—6 of Fig. 5 and showing the settable means in an offset position.

Figure 1:
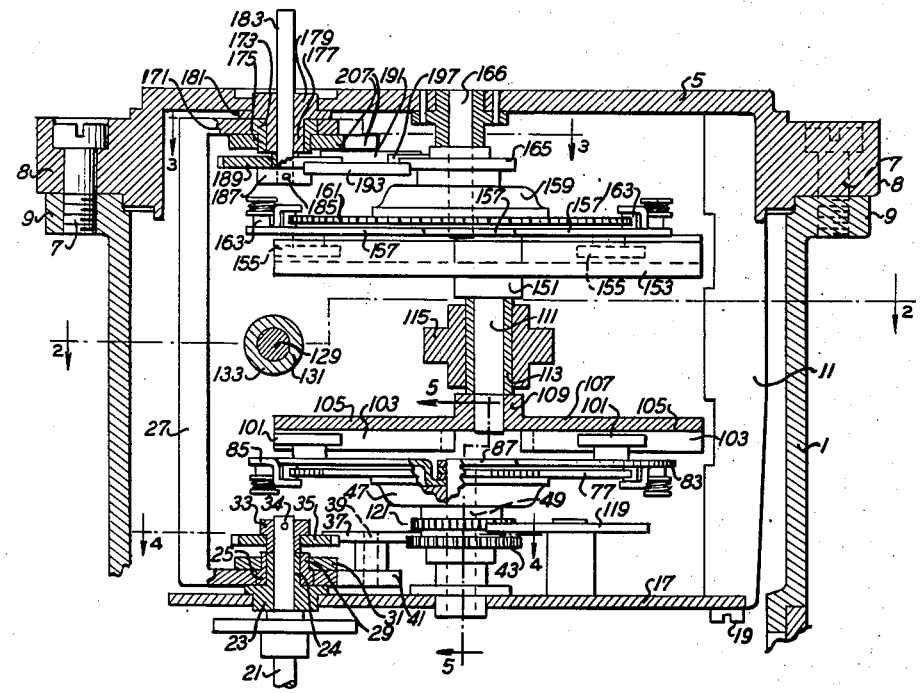
Fig. 1 is a vertical section of the variable ratio mechanism.
Figure 2:
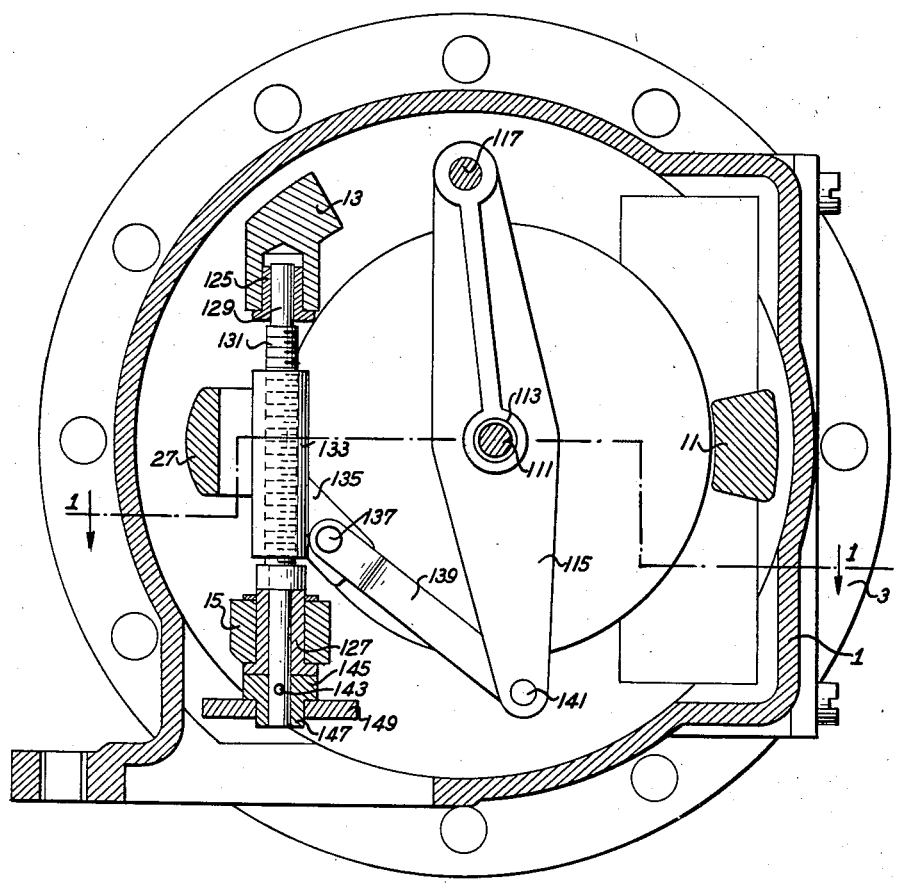
Fig. 2 is a horizontal section taken on line 2—2 of Fig. 1.

As shown in Fig. 1 the variable ratio mechanism is supported within a casing 1 which may be provided with a base flange 3, Fig. 2, for mounting this casing on a meter housing or other supporting member. An upper cover 5 is fitted to the walls of the casing and secured to the casing 1 by tap bolts 7 passing through lugs 8 of the cover and tapped into lugs 9 provided on the casing 1. These lugs and tap bolts may be of sufficient number and distributed about the circumference of the casing to secure the cover 5 to the casing. The cover 5 serves as a support for the various members of the variable ratio mechanism which as a unit may be removed from the casing together with the cover 5.

For supporting the lower end of the variable ratio mechanism, depending from the cover 5 and rigidly attached thereto is a support 11. This support in the embodiment being described together with supports 13 and 15, Fig. 2, also depending from and rigidly secured to cover 5 support a lower plate 17 which is fastened to each of the supports 11, 13, 15 by cap screws 19. The cover 5 and the plate 17 are disposed in parallel horizontal relation and carry several bearings for rotatable elements and shafts as well as supports for studs on which certain other elements rotate. The cover and plate also carry other parts, as will be understood from the following description.

An input shaft 21 which may be connected, for example, by conventional means to a rotatable element of a volumetric displacement meter is supported in a bearing 23 which is suitably secured in an opening in the plate 17. This bearing has an upwardly extending hub 24 on which is secured a bushing 25. This bushing provides a cylindrical hub portion adjacent the bearing 23 on which a frame 27 to be further described is pivotally supported. On the shouldered portion 29 of the bushing 25 a double arm lever 31 is supported for swinging movement, this lever carrying one of the swinging idler gears which are moved into and out of mesh, as above referred to, for securing the desired rotation upon reversal of the input element or shaft.

Figures 3, 4:
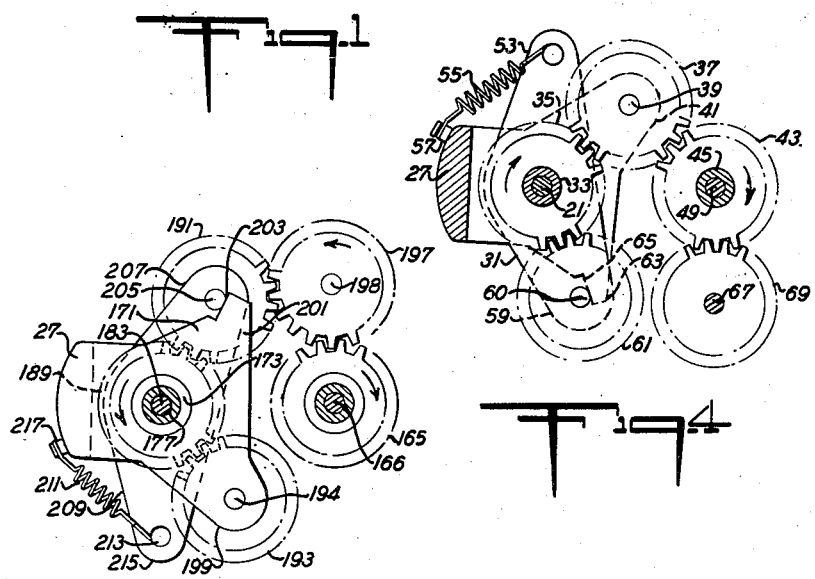
Fig. 3 is a horizontal section taken on line 3—3 of Fig. 1 and showing the output gear train.
Fig. 4 is a horizontal section taken on line 4—4 of Fig. 1 and showing the input gear train.

Secured to the shouldered portion of a bushing 33 which is pinned to the shaft 21 by pin 34 is the input gear 35 of the input train of gears. As shown in Fig. 4, the gear 35 meshes with an idler gear 37 which is rotatable on a stud 39 secured to arm 41 of the frame 27. The gear 37 in the position shown meshes with the gear 35 and also with a gear 43 which is rotatable on and concentric with the axis of a stud 49, Figs. 4 and 5, which is secured upon plate 17.

As shown in Fig. 5, the gear 43 is secured upon a shouldered portion 45 of a hub 47 which also is rotatable on stud 49, bushings 50 being provided within the hub 47 to provide bearing surfaces engaging the stud 49. The stud 49 is secured to plate 17 by flanged hub 51, the hub passing through an opening in the plate 17 and the flange being suitably fastened to this plate to provide a rigid support for the stud 49. With the gears 35, 37, 43 meshing, Fig. 4, rotation of the shaft 21 in the clockwise direction produces clockwise rotation of the gear 43 and the hub 47 to which it is secured.

As above mentioned the double arm lever 31 is supported on the bushing 29 for swinging movement of the arm 31 about the center of the shaft 21. To the arm 53 of the two-armed member 31, which in Fig. 4 extends upwardly, a spring 55 is attached, the opposite end of this spring being attached to a pin 57 secured in the frame 27 to bias the double arm lever 31 counterclockwise in Fig. 4 with respect to the frame 27. The other arm 59 of the lever 31 carries a stud 60 which rotatably supports an idler gear 61. The frame 27 also is provided with a portion 63 in which is formed a step providing a flat surface 65 against which the stud 60 bears under the bias of the spring 55. The spring is of such strength that under normal conditions the stud 60 is maintained in bearing relation to the flat surface 65 so that the double arm lever 31 and the frame member move as a unit in the pivoting or swinging movement of the frame on the shaft 21 which is effective to produce engagement of the idler gear 37 with the gear 43 when the frame 27 moves clockwise in Fig. 4 and to produce disengagement of the idler gear 37 from the gear 43 upon counterclockwise movement of the frame 27.

Rotatably supported on a stud 67 which by suitable means not shown in Fig. 1 is secured to the bottom plate 17 is a gear 69 of the input train of gears. The gear 69 meshes with the gear 43. When the frame 27 is moved counterclockwise from the position shown in Fig. 4 the gear 61 is moved into mesh with the gear 69. If shaft 21 and the input gear 35 continue to rotate in a clockwise direction, the direction of rotation of the gear 43 would be changed from clockwise to counterclockwise when the gear 61 is in mesh with the gear 69. Since it is desired in the construction being described to maintain the rotation of the gear 43 and of the hub 47 always in the same direction, namely, clockwise in Fig. 4, in order to secure unidirectional rotation of the input member or ratchet of the variable ratio drive, provision is made as hereinafter described to insure that such reversal does not occur.

When the direction of rotation of the input shaft 21 is changed from clockwise to counterclockwise, then the counterclockwise movement of the frame 27 is effective to bring the idler gear 61 into mesh with the gear 69 which meshes with the gear 43. Counterclockwise rotation of the gear 35 secured to the shaft 21 produces clockwise rotation of the idler gear 61 and counterclockwise rotation of the gear 69 to effect the desired clockwise rotation of the gear 43. It will be understood, therefore, that the gear 43 and the hub 47 always are rotated in the same direction in the specific embodiment described for either direction of rotation of shaft 21.

The disposition and support of the idler gears 37, 61 by frame 27 and its cooperating double arm lever 31 is such that in the clockwise rotation of the shaft 21 the idler gear 37 is subjected to a force tending to move this gear into mesh with the gear 43 under the reaction and resistance to rotation of the gear 43 and the members driven thereby. It will be understood that this force is secured because, if rotation of gear 37 is resisted, the gear 37 and the gear 35 tend to become locked together and to rotate as a unit clockwise with and about the axis of the shaft 21, thereby to bring the teeth of the gear 37 into mesh with the teeth of the gear 43. Correspondingly, because engagement of the stud 60 with the surface 65 of the frame 27 is maintained by spring 55, the gear 61 is biased out of engagement with the gear 69 by the clockwise rotation of shaft 21.

Upon rotation of the shaft 21 in the counterclockwise direction, resistance to the rotation of the gear 61 transmitted from gear 43 through gear 69 tends to lock the gear 61 to the gear 35 and to produce counterclockwise rotation of the frame 27 with shaft 21. Such rotation, having regard to the tension of the spring 55, also rotates the double arm lever 31 in a counterclockwise direction and the gear 61 carried by the arm 59 of this lever is biased toward engagement with the gear 69. Thus, in the respective directions of rotation of the shaft 21 the swinging idler gears 37, 61 respectively are biased into engagement with the gears 43, 69 which they drive under the driving action of the gear 35 with which the two idler gears 37 and 61 are in mesh.

If, in moving the idler gear 37 into mesh with the gear 43 these gears should engage at the tops of their teeth, clockwise rotation of the frame 27 would be arrested but the gear 37 driven by the gear 35 and frictionally engaging the gear 43 would slip relative to gear 43 until the teeth of the gears 37 and 43 would mesh. While such clockwise movement of the frame 27 is arrested the gear 61 also would be rotated in mesh with the gear 69 but the counteracting force of the gear 69 resisting rotation of the gear 61 would tend to lock the gear 61 to the gear 35 and thus produce clockwise rotation of the double arm lever 31 until the gear 61 is moved out of mesh with the gear 69. This clockwise movement of the lever 31 may take place due to the forces just referred to concomitantly with stretching of the spring 55 until disengagement of the gear 61 is effected with ultimate meshing of gears 37 and 43. It thus will be apparent that the arrangement and disposition of the input gear train shown in Fig. 4 provides for the desired unidirectional rotation of the gear 43 and of the hub 47 upon which it is carried and for the biasing of the idler gears 37, 61 of the input gear train respectively into mesh with the gears 43 and 69 according as the direction of rotation of the input shaft 21 is clockwise or counterclockwise.

The center line 71 of the stud 49, Fig. 5, is also the center line of the gear 43 and of the turned hub portion 45 of the hub 47 on which the gear 43 is fitted. The hub 47, however, is provided with a machined cylindrical shoulder 73 the center line 75 of which is offset slightly from the center line of the stud 49. This offset may be of different amounts depending upon the purpose of the variable ratio drive. In an embodiment which is suitable for a variable ratio mechanism driven by a liquid meter the amount of this offset or eccentricity may be of the degree of a few thousandths, for example, eight thousandths of an inch.

Upon the shoulder 73 of the hub 47 is mounted ratchet 77 which in the embodiment being described has 100 teeth. These teeth 79 are disposed on a pitch circle which is concentric with the shoulder 73. Having regard to the direction in which the section 5—5 is taken, that is, as viewed from the right in Fig. 1, the section shown in Fig. 6 is taken looking downward in Fig. 5. The teeth 79 are disposed on the ratchet 77 for rotation of this ratchet clockwise in Fig. 6 to drive a plurality of pawls engaged one at a time by these teeth. This direction of rotation is the same as the clockwise direction of the gear 43 as shown in Fig. 4 and described in connection with Figs. 1 and 4.

Supported on a machined cylindrical surface of an upwardly extending portion 81 of the hub 47, this cylindrical surface being concentric with the center line 75 of the shoulder 73 of the hub are four rocker arms 83, 85, 87, 89. These rocker arms are provided with offset portions 91, the offsets being of different amount in the respective arms so as to bring all of the arms into the same plane as shown in Fig. 5. By this arrangement the pawls 93 which respectively are carried by the arms 83, 85, 87, 89 are disposed generally in the plane of the ratchet 77. These pawls are supported on pins 95 which are secured to the respective arms and disposed on the center line of the arm with respect to which the outline of the arm is symmetrical. These arms also provide ears 97 which extend over the face of the ratchet at the opposite side of the ratchet from the body of the arm for limiting movement of the outer portion of the arm in the direction parallel to the axis of rotation which may otherwise occur due to the limited bearing of arms on the portion 81 of the hub 47.

These arms are all independently rotatable on the cylindrical surface of the hub portion 81. While, as hereinafter described, the arms rotate concomitantly with the ratchet and with the settable spider about to be described, these arms also are capable of moving independently of each other with respect to the ratchet and, as will become clear from further description, such relative movement is produced by the mechanism.

Each of the arms 83, 85, 87, 89 carries a roller 101 which is supported on a stud 102 secured to the arms. These rollers, as may be seen in Fig. 6, are disposed for engagement with parallel faces of channels 103 which are formed in each of the four branches 105 of a spider 107 having a hub 109 secured upon a shaft 111, Figs. 1 and 5. Rotation of the spider 107 is effected by the rollers engaging the channels upon rotation of the arms 83, 85, 87, 89, so that the spider rotates together with the shaft 111 concomitantly with rotation of the ratchet 77.

It will be noted from Fig. 6 that the centers of the studs 102 for rollers 101 are disposed differently in the different arms. The stud 102 is disposed on the center line of the arm 83 with respect to which the outline of the arm is symmetrical, this center line also passing through the center of the pin 95 upon which the pawl 93 of this arm is pivotally supported. The stud 102 of the arm 85 upon which the roller 101 is supported is disposed on a center line angularly offset toward the right or clockwise in Fig. 6 a small amount from the center line drawn to the pin 95 upon which the pawl 93 of this arm is pivoted. Similarly the stud 102 of the arm 87 is angularly offset clockwise to a somewhat greater extent from the center line to the pin 95 of the pawl 93 of the arm 87. The stud 102 in the arm 89 is angularly offset clockwise a still greater amount from the center line drawn to the pin 95 carrying the pawl 93 on this arm.

In the positions of the arms and ratchet in Fig. 6 the toe of the pawl 93 of the arm 83 is in engagement with the teeth at the bottom of the space therebetween, The toe of the pawl of the arm 85, however, is disposed near the tip of the tooth adjacent the space. The toe of the pawl of the arm 87 is disposed about half way upon the slope of the ratchet tooth and the toe of the pawl of the arm 89 is disposed near but not at the bottom of the space between two teeth. These different positions of the pawls with respect to the ratchet teeth are in part due to the different amount of offset of the studs 102 but also in part are due to the eccentric setting of the spider 107 and its channels 103 which engage rollers 101. The dispositions of the pawls 93 of arms 87 and 89 might be otherwise than as shown for a different eccentric setting of the spider 107 and its shaft 111 with respect to the axis 71 of rotation of the ratchet hub 47. For the position of the spider 107 assumed in Fig. 6 the channels 103 associated with arms 83 and 85 are parallel to the direction of offset of the shaft 111.

The shaft 111 which carries the spider 107 is supported for rotation in a bushing 113 which is supported in a swinging arm 115, Figs. 1 and 2. This swinging arm is pivotally supported on a fixed spindle 117 which may be held by suitable means, not shown, at the ends thereof respectively in the cover 5 and the lower plate 17. This spindle 117 extends parallel to the axis of the shaft 111 and parallel to the axis of rotation of the ratchet 77 and of the gear 43. By swinging movement of the arm 115 on the spindle 117 the shaft 111 is moved to different positions offset from the center of rotation of the gear 43. This has the effect of moving the center of rotation of the spider from the position concentric with the axis of the gear 43. Such an eccentric position of the spider is shown in Fig. 6 in which the shaft 111 and the spider have been moved downwardly parallel to the channels associated with arms 83, 85.

Such movement has the effect of moving the rollers 101 carried respectively by the arms 87 and 89 downwardly in Fig. 6 so that these arms and the centers of the pins 95 on which the respective pawls 93 are supported are in closer angular relation to the arm 83 than the arms 87 and 89 are to the arm 85. In such movement of the swinging arm 115 and of the shaft 111 therewith to move the spider to a position such as that of Fig. 6 from a position in which the center of the shaft 111 is closely adjacent the axis 71 of the stud 49 and gear 43 and coaxial with the center of the ratchet 77, the pawl 93 of the arm 89 is moved downwardly to slip over a certain number of teeth of the ratchet and the pawl 93 is moved downward into engagement with a tooth of the ratchet. Such engagement of the pawl with a ratchet tooth may effect rotation of the ratchet, counterclockwise in Fig. 6, with corresponding slipping of the teeth of the ratchet beneath the respective pawls on the arms 83, 85, 89. If, however, as is preferable, such rotation of the ratchet which is the reverse of the unidirectional clockwise rotation in which this ratchet normally moves is prevented by the driving mechanism or by a detent pawl 119 engaging a detent ratchet 121, Figs. 1 and 5, then a rotational movement of the spider may occur during such movement of the swinging arm 115 so that the arms 83, 85, 89 are moved clockwise in Fig. 6 with corresponding slipping of their pawls over the teeth of the ratchet to position the arms 83, 85, 87, 89 in positions determined by the engagement of the rollers 101 in the respective channels 103 of the spider.

The initial offsetting of the shaft 111 which is effective to produce the relative movement of the arms 87, 89 with respect to the ratchet also disposes these arms in an angular relation to each other and to the arms 83, 85 such that during rotation of the ratchet 77 at a uniform rate in the clockwise direction, Fig. 6, an arm moving with the ratchet between the position of the arm 89 and the position of the arm 87 will drive the spider 107 with an angular velocity which is greater than the angular velocity of the spider driven by this arm in moving from the position of the arm 87 to the position of the arm 89 in the upper part of the clockwise rotation of Fig. 6. Since the spider is a rigid member and all four branches thereof rotate with the same angular velocity about the axis of the shaft 111, the pawl carrying arms other than the arm which is being driven by the ratchet 77 by virtue of engagement of its pawl 93 with the ratchet teeth will be driven with corresponding greater and less angular velocity about the axis 71 of the stud 49 which supports for rotation the hub 47 and the ratchet 77 as well as the arms 83, 85, 87, 89.

Because of this variation in the angular velocity of rotation of the spider 107 and of the respective arms the pawls 93 which are carried by these arms, except that which is engaged by and is being driven by the ratchet, move ahead of the ratchet teeth in the lower portion of the rotation in Fig. 6 and lag behind the ratchet in the upper portion of the rotation. During such movement of a given pawl ahead of the ratchet in the lower part of the rotation in Fig. 6, this given pawl may move over the tip of a ratchet tooth and into the next space. Depending on the position of the pawl in the lower portion of the rotation this pawl then may become the pawl which is driven by the ratchet and the other pawls may be moved ahead or may move in lagging relation to the rotation of the ratchet until one or the other of these pawls becomes positioned in engagement with the bottom of the space between the two ratchet teeth and may become the driven pawl.

It thus will be understood that the ratchet rotating at a uniform rate causes the spider 107 and the shaft 111 on which the spider is secured to advance a small amount ahead of the ratchet for each revolution of the ratchet. With a ratchet of 100 teeth, as in the embodiment being described, each pawl must pick up an integral number of teeth, if it picks up any at all, during the interval in which the ratchet is turning a quarter of a revolution or 25 teeth. If one tooth is picked up in such quarter rotation of the ratchet the increment of drive ratio will be about 4%. Such a large increment is excessive for varying the ratio in connection with a positive displacement meter. In accordance with the invention, however, other means are provided, as more fully described hereinafter, for reducing this increment so that the incremental variation of the ratio of rotation of the output member to the input member substantially gives the effect of a smooth curve and with the cyclic variations minimized.

As shown in Fig. 2 the supports 13 and 15 carry bearings 125, 127 in which a shaft 129 is supported for rotation thereof on an axis which is perpendicular to the axis of the shaft 111. The shaft 129 has a threaded portion 131 which engages an internally threaded sleeve 133 having a web 135 angularly projecting therefrom. This web carries a pin 137 to which is pivotally connected a link 139 which at its other end is pivotally connected at pin 141 to the end of the swinging arm 115 which is opposite to the end which is carried on spindle 117. The shaft 129 at the lower end thereof in Fig. 2 has secured thereto by pin 143 a hub 145 which has a shouldered portion 147 on which a driving gear or other driving element 149 is secured. This driving element may be rotated by a suitable connection to a control mechanism, for example, to an automatic densitometer such as that shown in the Patent No. 2,727,392 to Hazard and MacDonald, issued December 20, 1955. As will be understood from this patent the shaft 129 thus driven will be rotated with a slight cyclic variation due to the normal hunting of the output shaft of the densitometer. This normal hunting of the shaft 129 is utilized to produce a slight cyclic variation in the eccentricity of the shaft 111 with respect to the ratchet 77, as will be understood from the following description.

The rotation of the shaft 129, although cyclically varying, proceeds in a given direction when the densitometer operates in response to an increase in the density of the liquid being measured and in the reverse direction for a decrease in the density. Such rotation of the shaft 129 in a given direction will produce movement of the threaded sleeve 133 in the downward direction in Fig. 2, for example. This downward movement will produce a thrust in the link 139 which will effect movement of the pin 141 to the right and corresponding movement of the shaft 111 to the right to the position as shown in Figs. 1 and 2. If, on the other hand, change in the density of the liquid should occur in the opposite direction, then the gear 149 and the shaft 129 would be rotated in the opposite direction and the sleeve 133 will be moved upwardly in Fig. 2 to draw the pin 141 toward the left to move the shaft 111 to the left so as to secure a reduced eccentricity of the spider 107 with respect to the ratchet 77 and the arms 83, 85, 87, 89. Within the scope of the invention, however, the shaft 129 may be manually rotated to set the sleeve 133 in a predetermined position to secure a predetermined eccentric position of the shaft 111 and of the spider 107.

Secured to the upper end of the shaft 111, Fig. 1, is the hub 151 of an upper spider 153 of the same form and dimensions and having the same number of channels as the lower spider 107. Disposed within the respective channels are rollers 155 which are carried on respective arms 157 of which there are four disposed in the same general arrangement as that shown in Fig. 6, these arms 157 being supported on and for rotation movement relative to the protruding portion of a hub 159 upon a shoulder of which the upper ratchet 161 is carried similarly to the support and disposition of the arms and ratchet of the lower assembly, as shown in Figs. 5 and 6. The arms 157 respectively carry pawls 163 for engagement with the teeth of the upper ratchet 161. The teeth of this ratchet are disposed thereon so that in the clockwise rotation of the ratchet which is effected by the driving engagement of the channel branches of the spider 153 with the rollers 155 and by engagement of the pawls 163 with the ratchet teeth, the hub 159 and the gear 165 carried thereon similarly to the gear 43 of the lower assembly are rotated on the stud 166 in the clockwise direction when viewed looking downwardly in Fig. 1. All of the parts of the upper assembly just referred to are in inverted positions with respect to the same parts in the lower assembly.

It will be understood, because the variable ratio mechanism of the invention utilizes a ratchet as a device providing definite increments of movement rather than the more gradual variation of devices utilizing friction or gripping so as to avoid the disadvantages which have been referred to above, that it is essential that the unidirectional rotation of the ratchets shall be maintained and that both of the ratchets and the associated pawl carrying arms and the spider actuated by or actuating these arms shall rotate in the same direction. While the ratchets and the structure which has been described above provide for slipping of the pawls with respect to the teeth in some portions of the rotation in order to secure the increments, nevertheless, one or the other of the pawls associated with the respective ratchets operates as a detent to prevent reverse rotation of the ratchets, so that the rotation initiated at the gear 43 also results in rotation in the same direction at the gear 165.

As shown in Fig. 3 which is a section taken on line 3—3 of Fig. 1, an output gear train is supported by the frame 27 the upper bracket 171 of which carries a bushing 173 having a downwardly extending hub 175 which bears on the exterior cylindrical surface of a hub portion 177 of a bearing 179 which is disposed in an opening in the upper cover 5 and secured thereto by suitable means engaging the flange 181.

The bearing 179 supports for rotation therein the output shaft 183 to which is pinned by a pin 185 a bushing 187 upon which is secured the output gear 189 of this output gear train. Rotation of this gear is effected through the train of gears between the gear 165 and the gear 189 which includes swinging idler gears 191 and 193, Figs. 1 and 3, and the idler gear 197 which is supported on a stud 198, not shown in Fig. 1, which is fixed in the upper cover 5. As the gear 165 rotates always clockwise when viewed from above as in Fig. 3, the gear 197 always rotates counterclockwise on this stud. The gears supported in the swinging frame 27 in Fig. 3 are shown with the swinging idler gear 191 in mesh with the idler gear 197. The swinging idler gear 193 is out of mesh with the gear 165. This idler gear 193 is supported for rotation on stud 194 secured in the arm 199 of the bracket 171 of frame 27. The other arm 201 of the bracket 171 is formed with a step or shoulder providing a surface 203 for engagement with the pin 205 which is carried by the arm 207 of a double arm lever 209. A tension spring 211 connects from a pin 213 carried by the arm 215 of the double arm lever 209 to a pin 217 carried by the frame 27. The double arm lever 209 thus is biased clockwise in Fig. 3 with respect to the frame 27 to maintain the pin 205 in engagement with the surface 203 of the bracket 171. Normally the swinging idler gears 191 and 193 which are in mesh with the gear 189 are swung as a unit upon swinging movement of the frame 27. By such swinging movement the gear 191 may be moved respectively into and out of mesh with gear 197 concomitantly with movement of the gear 193 out of and into mesh with the gear 165.

With the idler gears disposed as in Fig. 3 clockwise rotation of the gear 165 results in counterclockwise rotation of the gear 189 and of the shaft 183 to which it is secured. When the frame 27 is swung counterclockwise in Fig. 3 to bring the gears 193 and 165 into mesh the clockwise rotation of the gear 165 results in clockwise rotation of the gear 189, thus effecting reversal of the output shaft 183 in the two positions of the frame 27 and the corresponding positions of the idler gears 191, 193.

It will be clear from the description in connection with Figs. 3 and 4 that the gears 191 and 197 are in mesh when the gears 37 and 43 are in mesh and that counterclockwise movement of the frame 27 will move the gears 191 and 37 out of mesh respectively with gears 197 and 43 as the gears 193 and 61 are moved into mesh respectively with the gears 165 and 69. When, therefore, the input shaft 21 is rotated in the clockwise direction with the gears disposed as in Fig. 4 to produce clockwise direction of the gear 43 and of the gear 165, rotation of the output shaft 183 will be produced in the counterclockwise direction. When, however, the frame 27 is moved counterclockwise in Figs. 3 and 4 to move gears 191 and 37 out of mesh and to bring into mesh the gears 193 and 61 respectively with the gears 165 and 69, the rotation of the output shaft 183 will be produced in the clockwise direction upon reversing the rotation of the input shaft 21 from the clockwise to the counterclockwise direction. The direction of rotation of both the lower gear 43 and of the upper gear 165 and of the ratchets and other parts above described which are rotatable therewith, nevertheless will be unchanged, that is to say, will be clockwise when viewed from above in Fig. 1.

Since the gear 165 and the idler gear 197 continually meshing therewith are driving in the output train of gears, as shown in Fig. 3, the reaction of the force in the rotation of the gear 189 counterclockwise in Fig. 3 is effective to bias the frame 27 clockwise to maintain the gears 191 and 197 in meshing relation. Similarly when the frame 27 is moved from the position shown in Fig. 3 to bring the gears 193 and 165 into mesh, thus reversing the rotation of the gear 189 and the output shaft 183, the reaction produced is effective to bias the gear 193 into mesh with the gear 165. Thus, in both dispositions of the idler gears the meshing relation of the gears of the output train is maintained.

Similarly to the arrangement provided for the input train of gears the double arm lever 209 and the spring 211 are effective to provide for movement of this double arm lever relative to the frame 27 if the teeth of the gear 191 come into engagement with the tops of the teeth of the gear 197. Since, however, the gears 165 and 197 are being rotated, slipping movement of the gear teeth of the gears 191 and 197 may occur until the teeth are brought into position to mesh. If, in the counterclockwise movement of frame 27, the teeth of the gear 193 come into engagement with the tops of the teeth of the gear 165, thus stopping movement of the frame 27 and of the bracket 171 upon the axis of the output shaft 183, the rotation of the gear 197 driven by the gear 165 will tend to produce pivoting movement of the double arm lever 209 counterclockwise in Fig. 3 against the bias of the spring 211 until the gears 191 and 197 are out of mesh or until slippage occurs between the gears 193 and 165 to allow these gears to move into meshing relation with each other.

The arrangement of the gear trains in the frame 27 and with respect to each other in Figs. 3 and 4 is such that the space between the idler gear 193 and the gear 165 is greater than the space between the idler gear 61 and the gear 69, or between the corresponding gears when the frame 27 is moved counterclockwise to correspond to reversal of the input and output shafts. As an indication of a suitable difference in these spaces in an embodiment such as that being described, the space between the gears 61 and 69 in their out of mesh positions, as shown in Fig. 4, may be .067 inch and the space between the gears 193 and 165 may be .087 inch. The amount of this difference of spacing will depend upon the size of the gears and the number of teeth and the pitch thereof.

It will be clear from the description in connection with the gear trains which are utilized in the mechanism of the invention that reversal of the output shaft is accomplished upon reversal of the input shaft while maintaining the unidirectional drive within the variable ratio mechanism to secure incremental or step by step movement such as may be provided by the ratchets as well as to provide an incremental variation of such movement. It also will be understood that both gear trains are so constructed that for the desired direction of rotation of both the input and the output shafts the swinging idler gears will be biased into engagement with the proper gears that are rotatable on fixed axes so that these idler gears do not tend to move out of mesh under the forces due to driving the machanism.

Referring again to Figs. 5 and 6, because of the different offset positions of the studs 102 for the rollers 101, as above described and as shown in Fig. 6, the pawls 93, although they are of the same form and length relative to their pivotal axes, in effect are of different length with respect to the radius drawn from the axis of the spider to the center of the stud 102. These different offset distances of the studs 102 thus secure the disposition of the toe of the different pawls in different positions with respect to the bottom of the space between two ratchet teeth. Having regard to the advance during a rotation of the ratchet of certain of the arms and the pawls carried thereby in the manner above described, the difference in the effective length of the pawls effects variation in the pawls which are picked up during each quarter of the rotation of the ratchet and the advance is varied by a small increment. This variation of the advance is such that with the assumed number of 100 teeth in the ratchet, the increment of ratio referred to above which is 4% when one tooth is picked up in one quarter of a rotation is reduced to 1% by the disposition of the pawls to secure this effective difference in their length.

In order to minimize the effect of the cyclic variation in the rotation of the spiders and the resulting variation in the rotation of the output shaft with respect to the input shaft, the four arms of the upper spider are angularly displaced on shaft 111 with respect to those of the lower spider so that the arms of one bisect the angle between the arms of the other spider.

A further modification of the increment in ratio is secured by offsetting the center line of the axis of the input gear 165 of the output train with respect to the output gear 43 of the input train. This offset may be slight to produce in the embodiment being described an increment equivalent to ⅛ of a tooth of either ratchet, so that the increment of ratio may be further reduced from 1% to ½%.

As above stated and as shown in Fig. 5, the axis of rotation of the gear 43 is offset slightly from the axis of the ratchet 77. Thus, since the axis of rotation of the gear 43 is the axis of the stud 49, the axis of the ratchet and of the arms cooperating therewith rotates in a very small circle about the axis of the stud 49. This eccentricity secures during the slow rotation of the ratchets and the respective spiders relative to each other a very small cyclic variation in the offset of the shaft 111 from the center of the ratchets because of the interconnection of the arms carrying rollers 101 which are engaged in the channels 103 of the spider as described above. This construction has the effect of cyclicly varying the number of teeth of the ratchets picked up by the pawls which further modifies the increment of change in the ratio for a given setting of the arm 115 and of the shaft 111. The degree of offset of the axis 71 of the stud 49 from the ratchet axis 75 in an embodiment such as that being described may be .008 inch to secure an advance of less than one eighth of a tooth of the ratchet and to reduce the increment of ratio to ¼%.

Since the arm 115 which supports the shaft 111 carrying the spiders 107 and 153 is pivotally supported on the spindle 117, the angular movement of the shaft 111 to its different positions introduces a factor of non-linearity in the relationship between the movement of the center line of the shaft 111 and the change in the output ratio. To compensate for this non-linearity the link 139 which provides the connection between the sleeve 133 and the arm 115 is of such length and the pins 137 and 141 are so disposed respectively in sleeve 133 and the arm 115 that, for a given increment of movement of the sleeve 133 along the axis of the shaft 129, the increment of movement of the pin 141 and of the shaft 111 will be least when the sleeve 133 is in a position downwardly along the shaft 121 in Fig. 2 and greatest when the sleeve is in a position upwardly along the shaft 129. For a given increment of movement of the sleeve 133 the least increment of movement of the shaft 111, therefore, occurs at the position of the greatest offset of the shaft 111 from the center line of the ratchet, that is, in the position for operation in the zone of greatest angular movement of the spider relative to the ratchet as described above. Correspondingly with a small offset of the shaft 111 and, therefore, operation in the zone of small difference in the angular movement of the spider relative to the ratchet the greatest increment of movement of the shaft 111 is effected for a given increment of movement of the sleeve 133 when this sleeve is in the position upwardly in Fig. 2.

It will be understood that the eccentric offset of the axes of the ratchets with respect to the studs on which they are supported, the axes of these studs being the axes of rotation respectively of the gear 43 and of the gear 165, and the offset of the axis of the stud 166 on which the gear 165 rotates from the axis of the stud 49 on which the gear 43 rotates, the angularly displaced disposition of the two spiders relative to each other, the offset of the studs 102 and rollers 101 with respect to the pawls 93, and the provision of two assemblies of this character coordinated with the settable means for varying the ratio of the drive, all cooperate to geometrically subdivide the positive increment which is secured by utilizing the ratchets. Having regard to such means for securing small increments of movement of an output member of the device of the invention with respect to the movement of an input member, and also taking into account that the shaft 111 may be moved very gradually by rotation of the shaft 129, Fig. 2, the effect of a substantially smooth curve of variation of the ratio of the drive may be secured.

Variations in the structure from that disclosed in connection with the drawings may be made within the scope of the invention which will embody the features which have been described for securing the positive step by step action with steps of very small size to secure increments of variation of the ratio which in effect are along a smooth curve. Other structures also may be provided which embody the features of the input and output gear trains for insuring the proper directions of rotation and the positive engagement of the gears which have been described.

I claim:

1. In a variable ratio transmission, the combination with an input element, an output element, a variable ratio mechanism having a unidirectional input member and a unidirectional output member, and means settable to different positions to determine different ratios and operatively connected to said input member and to said output member to effect concomitantly with operation of said input member operation of said output member in a selected ratio to said input member upon a selected setting of said settable means, of an input gear train, an output gear train, said trains being respectively connected to said unidirectional input and output members of said mechanism and to said input and said output elements for transmitting the drive through said gear trains and said variable ratio mechanism from said input element to said output element, each of said gear trains having an input gear and an output gear, said trains each providing a given idler gear and an alternate idler gear, means supporting said idler gears for movement of said given idler gear of each train into and out of mesh with a predetermined gear of said train respectively upon movement of said alternate idler gear of said train out of and into mesh with another predetermined gear of said train for reversing in each train the direction of rotation of said input and output gears of said train with respect to each other, and means operatively connecting said gear trains for effecting concomitantly said movements of said idler gears of the two trains into and out of mesh with said predetermined gears of said trains so as to effect reversal of said output element upon reversal of said input element while maintaining unidirectional operation of said mechanism.

2. In a variable ratio transmission, the combination as defined in claim 1 in which said idler gears of the respective gear trains are supported by said supporting means and disposed for movement of said given and alternate idler gears of each train respectively into engagement with said two predetermined gears of said train under the bias of the force developed in the rotation in the respective directions of said input gear of said input train and of said output gear of said output train.

3. In a variable ratio transmission, the combination as defined in claim 1 in which in the gear train connected to said input element and to said unidirectional input member of said variable ratio mechanism the clearance of the idler gears in their out of mesh positions in relation to the respective predetermined gears is less than the clearance of the idler gears in said other train in their out of mesh positions in relation to the respective predetermined gears of said other train, so as to insure meshing of the gears of said input train before meshing of the gears of said output train and demeshing of said input gears after demeshing of the gears of said output train.

4. In a variable ratio transmission, the combination with an input rotatable shaft, an output rotatable shaft, a variable ratio mechanism having a unidirectional rotatable input member and a unidirectional rotatable output member, and means settable to different positions to determine different ratios and operatively connected to said rotatable input member and to said rotatable output member to effect rotation of said output member in a selected ratio to the rotation of said input member at a selected setting of said settable means, of an input gear train, an output gear train, said input gear train having an input gear operatively connected to said input shaft for rotation of said input gear of said input train upon rotation of said input shaft, said input gear train having an output gear operatively connected to said unidirectional rotatable input member of said variable ratio mechanism to effect rotation of said input member upon rotation of said output gear of said input train, said unidirectional rotatable output member of said variable ratio mechanism being operatively connected to said input gear of said output gear train for effecting rotation of said input gear of said output train upon rotation of said rotatable output member of said mechanism, said output gear train having an output gear operatively connected to said rotatable output shaft for effecting rotation of said output shaft upon rotation of said output gear of said output gear train, said trains each providing a given idler gear and an alternate idler gear, means for supporting said idler gears of each train for movement of said given idler gear into and out of mesh with a predetermined gear of said train respectively upon movement of said alternate idler gear out of and into mesh with another predetermined gear of said train for reversing in each train the direction of rotation of the input and output gears with respect to each other, and means operatively connecting said supporting means for effecting concomitant movements of said idler gears of both trains into and out of mesh with the respective predetermined gears of said trains to effect reversal of said output shaft upon reversal of said input shaft while maintaining unidirectional operation of said mechanism.

5. In a variable ratio mechanism the combination as defined in claim 4 in which said unidirectional input member comprises a ratchet rotatable on an axis, said unidirectional output member comprising a ratchet rotatable on an axis, an intermediate member supported for rotation thereof on an axis and for movement of said axis to different positions eccentric to the axes of rotation of said ratchets, a pair of pawl arms supported adjacent each ratchet for separate rotational movement of said arms on axes parallel to said ratchet axes, each pawl arm carrying a pawl for engaging the teeth of the adjacent ratchet, and means operatively connecting said pawl arms to said intermediate member for rotational movement of said arms concomitantly with rotation of said intermediate member and concomitantly with rotation of said ratchets and so as to effect relative rotational movement of said arms on their axes with respect to said ratchets to produce an increment of rotation of said output ratchet with respect to the rotation of said input ratchet upon a selected eccentric setting of said axis of said intermediate member.

6. In a variable ratio mechanism the combination as defined in claim 5 in which the respective pawl arms associated with each ratchet are connected to said intermediate member at points on said arms providing different effective lengths of said pawls with respect to the effective radial lines to said points of connection on the respective arms for avoiding imparting equal increments of rotation to said ratchet by said pawls associated with said ratchet.

(References on following page)

References Cited in the file of this patent

UNITED STATES PATENTS

| | | |
|---|---|---|
| 1,011,163 | Cooper | Dec. 12, 1911 |
| 1,079,044 | Foster | Nov. 18, 1913 |
| 1,614,203 | Ljungstrom | Jan. 11, 1927 |
| 2,291,883 | Craig | Aug. 4, 1942 |
| 2,506,562 | Wait | May 2, 1950 |
| 2,727,392 | Hazard et al. | Dec. 20, 1955 |

FOREIGN PATENTS

| 492,692 | Italy | Mar. 29, 1954 |
|---|---|---|